Patented Aug. 10, 1954

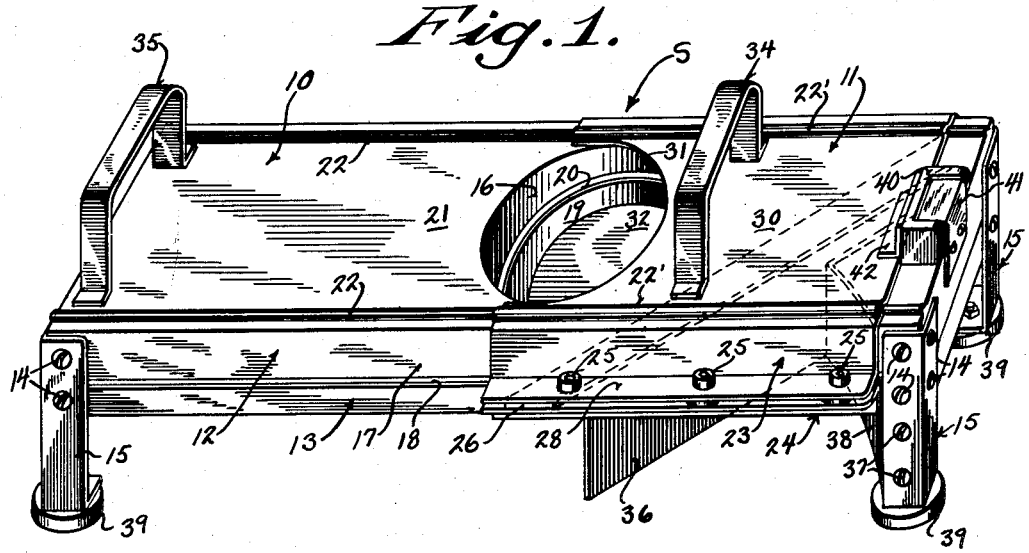
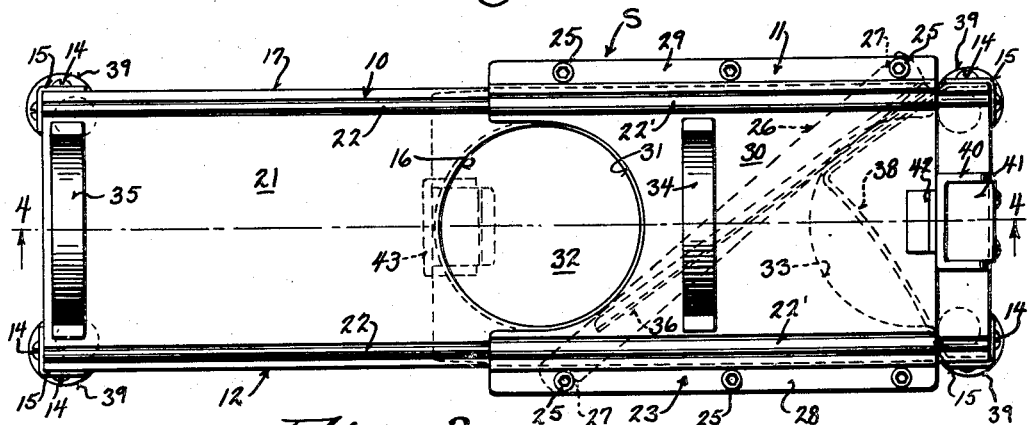
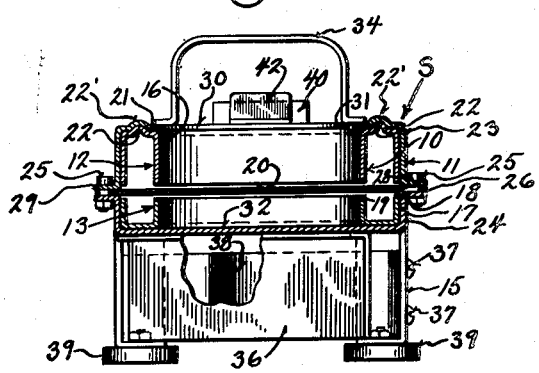
INVENTOR
MICHAEL PUTZER
BY
ATTORNEYS

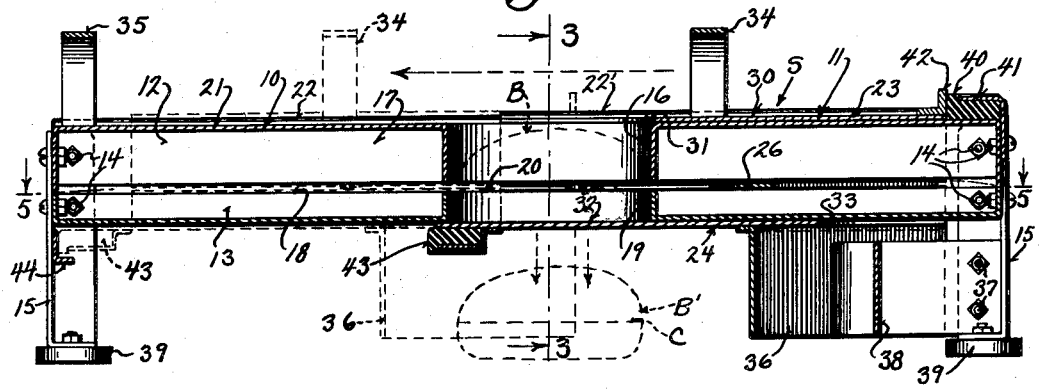
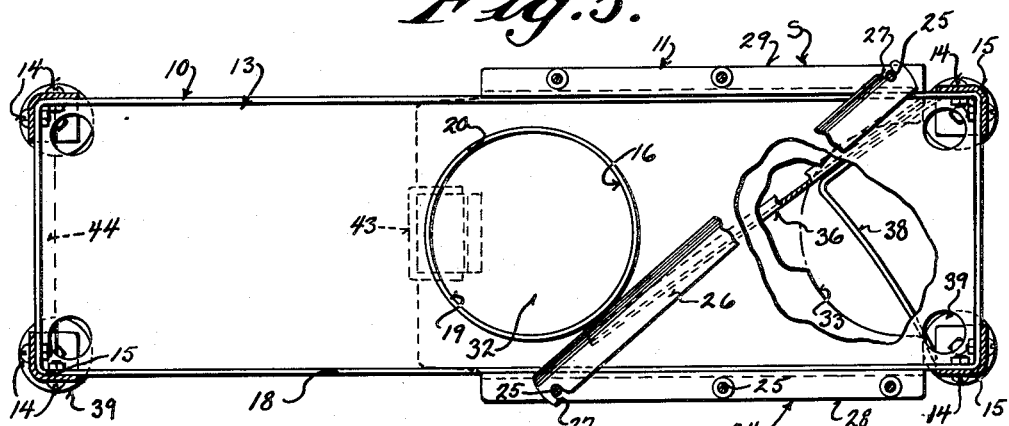
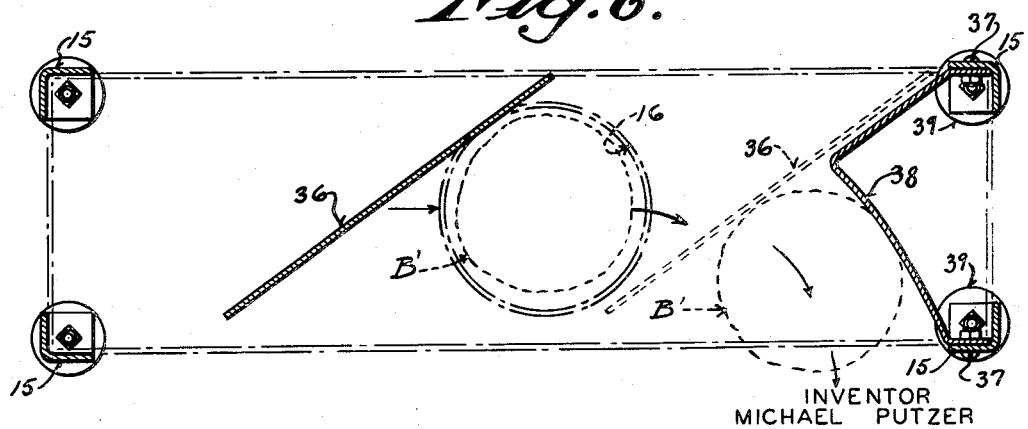

2,685,901

UNITED STATES PATENT OFFICE 2,685,901

BUN SLICING MACHINE

Michael Putzer, Racine, Wis.

Application November 23, 1951, Serial No. 257,823

3 Claims. (Cl. 146—151)

My invention appertains to slicing machines and more particularly to a portable machine or device for slicing and splitting buns for home and restaurant use.

Heretofore, when it was desired to slice buns, rolls, or the like for use in making hamburgers, barbecues, etc., it was customary to place an individual bun on the table, take a knife in one hand and while pressing down on the upper portion of the bun with the other hand to cut the bun in a horizontal plane. Where it is necessary to slice a large number of buns for immediate use or in readiness for a normal day's need, the tediousness of the individual slicing operation as above set forth becomes clearly apparent. For this reason, it is frequently found that the operator will attempt to hold two or more buns with one hand while endeavoring to slice them with a knife in the other, this being a practice which will not only produce inefficient results in cutting, but often causes serious injuries to the hands of the operator.

It is, therefore, a primary object of my invention to provide a bun slicing machine which will eliminate the above disadvantages and which will slice the buns quickly and efficiently in the desired horizontal plane.

Another object of my invention is to provide a bun slicing machine comprising a longitudinally extending sheet metal casing having a walled central opening extending vertically therethrough and adapted to receive and hold the bun or roll in a safe, out of the way, position during the cutting operation.

A further object of my invention is to provide the bun slicing machine with a sliding carriage mounted on the casing and carrying a slicing knife which is adapted to travel in slots formed in the walls of the casing and central opening to effectively slice the buns held in the central opening.

Still another object of this invention is to provide my bun slicing machine with means associated with the sliding carriage for permitting the bun to drop to the surface under the machine after it has been sliced.

Another important object of my invention is to provide the under portion of the machine with a guide member and pusher plate, whereby when the sliding carriage is returned after the cutting operation to permit a new bun or roll to be placed in the walled bun receiving opening, the cut bun under the machine will be conveyed out of the way and in front of the operator.

A still further object of my invention is to provide a simple, practical and reliable construction that is economical to manufacture, easy to assemble and positive in its operation.

With the above and other objects in view which will more readily appear as the nature of the invention is better understood, the same consists in the novel construction, combination and arrangement of parts hereinafter more fully described, illustrated and claimed.

A preferred and practical embodiment of the invention is shown in the accompanying drawings, in which:

Figure 1 is a side elevational view in perspective of my novel bun slicing machine with the sliding carriage in its retracted position and the walled central opening ready to receive a bun, with certain details of the knife, pusher plate, and bun guide means being shown in dotted lines;

Figure 2 is a top plan view of my machine;

Figure 3 is a transverse vertical section through my machine illustrating certain details in the walled central opening and slicing knife, the section being taken on the line 3—3 of Figure 4 and looking in the direction of the arrows;

Figure 4 is a longitudinal vertical section, taken on the line 4—4 of Figure 2, looking in the direction of the arrows, and showing in dotted lines the position of the sliding carriage after it has cut through the bun, and the two positions of the bun before and after the cutting operation;

Figure 5 is a longitudinal horizontal section through my machine, the section being taken on the line 5—5 of Figure 4 and looking in the direction of the arrows;

Figure 6 is a diagrammatic view illustrating how the sliced bun is conveyed from under the machine to the front of the operator, and showing in full lines the position of my novel pusher plate when the sliding carriage has been moved to the left and the cut bun deposited on the surface under the machine, and showing in dotted lines the position of the pusher plate when the sliding carriage is returned to its retracted position.

Referring now to the drawings in detail, wherein similar reference characters designate corresponding parts throughout the several views, the letter S generally indicates one type of my improved bun slicing machine, which includes broadly a longitudinally extending sheet metal casing 10 and a sliding carriage 11.

The longitudinally extending rectangularly shaped sheet metal casing 10 is formed from two similar parts, an upper portion 12 and a lower portion 13 rigidly secured together by nuts and bolts 14 which also serve to fasten the legs 15 to the casing. Extending vertically through the casing 10 is a centrally positioned walled opening 16 of a size and configuration to receive the flat roll or bun B. The side walls 17, formed by the upper and lower portions 12, 13 of the casing 10, are provided with longitudinally extending slots 18, and the cylindrical wall 19 of the central opening 16 is also provided with a slot 20 which is in alignment with and lies in the same horizontal plane as the slots 18. Extending longitudinally on the top wall 21 of the casing 10 is a pair of spaced guide beads 22 which are received in the guide grooves 22' of the sliding carriage 11. Guide grooves 22' form a support or bearing surface upon which the carriage 11 is adapted to travel.

Sliding carriage 11 is also constructed in two parts and lower portion 24 is firmly secured to the upper portion 23 by means of the bolts 25. An inclined cutting knife 26 is secured between the upper portion 23 and lower portion 24 of the carriage 11, and during the sliding movement of the carriage 11 cutting knife 26 travels in the longitudinal slots 18 and through the slot 20 of the central opening 16. Adjacent the outer ends and on each opposite edge of the knife 26 is a notch 27. Each notch 27 receives the shank of a respective bolt 25, which bolts are located on the opposite edges 28 and 29 of the sliding carriage 11 in diagonal spaced relation whereby the knife is secured against lateral movement.

The top plate 30 of the sliding carriage 11 has formed in its forward end an arcuate cut-out portion 31, formed therein to provide access to the central opening 16 when the carriage 11 is in its retracted position. On the other hand, the bottom plate 32 of the sliding carriage 11 closes the bottom of the central opening 16 when the carriage is in its retracted position, but is provided with an arcuate cut-out portion 33 on the rear portion thereof, shown more clearly in the dotted lines of Figure 2, which will permit the sliced bun to drop to the under surface of the machine when the sliding carriage is moved to the dotted line position of Figure 4. In this position the top plate 30 will partly close the top of the central opening 16 so that a new bun or roll will not be accidentally placed therein.

For facilitating the sliding of the carriage 11 back and forth on the casing 10, the top plate 30 is provided with a handle 34, and in order to steady the machine the top wall 21 of the casing 10 is also provided with a handle 35.

In operating my novel machine S, the flat roll or bun B is placed in the central opening 16 and rests on the plate 30 and the carriage 11 is slid to the left in the direction of the arrow, as shown more particularly by the dotted lines in Figure 4 of the drawings. During this movement, the knife 26 will sever the roll or bun in a horizontal plane and when the carriage 11 has been moved entirely to its left dotted line position as shown, the bottom of the opening 16 will be uncovered and the cut roll B' will fall downwardly through the opening on to the table surface.

An important feature of my device lies in the means for conveying the cut bun or roll B' out of the way and in front of the operator upon the return of the sliding carriage 11 to the right or full lined position. In order to facilitate the movement of the cut bun B', the plate 32 of the sliding carriage 11 has rigidly secured thereto a depending inclined pusher plate 36. Rigidly fastened to the inner surface of the legs 15 by means of the bolts 37 is a cooperating guide member 38, the purpose of which is readily apparent from an examination of Figure 6 of the drawings. As shown, when the bun B, illustrated in dotted lines of Figure 4, is placed in the central opening 16 and the sliding carriage 11 moved toward the left dotted line position, the knife 26 will cut the bun in half and the cut bun B' will drop in the direction of the arrows and be deposited on the table surface.

Referring now to Figure 6 of the drawings, it can be seen that when the carriage 11 is returned to the right to permit a new roll or bun to be placed in the opening 16, the depending pusher plate 36 will engage the cut roll or bun B' on the table and push the same in the direction of the arrows toward the dotted line position and guide member 37 where the bun B' will be conveyed in front of the operator.

If a large number of buns need to be cut, it may be necessary to rapidly reciprocate the sliding carriage 11, and in order to prevent the machine from slipping on the table surface, I provide each leg with rubber pads 39. I also provide an upper rubber bumper 40 which is securely held to the casing 10 by means of a clamping bracket 41. The rear or right end of the top plate 30 of the sliding carriage 11 is provided with an L-shaped stop 42 which in the extreme right hand position will bear against the rubber bumper 40. The forward portion of the lower plate 32 also carries a rubber bumper 43 which in the extreme left hand position will contact or abut stop 44 secured to the legs 15 as shown.

From the foregoing, it is believed that the features and advantages of the invention will be readily apparent to those skilled in the art, and it will of course be understood that changes in the form, proportion and minor details of construction may be resorted to without departing from the spirit of the invention or the scope of the appended claims.

I claim:

1. A bun slicing machine comprising a longitudinally extending rectangular casing having a vertical centrally positioned walled opening therethrough, a rectangular carriage open at both ends mounted on said casing for sliding movement, a bottom plate carried by said carriage closing the bottom of the central opening when the sliding carriage is in a retracted inoperative position, one end of said bottom plate having an arcuate shaped portion formed therein corresponding to the central opening and adapted to be in alignment with the central opening when the sliding carriage has been moved to complete the cutting operation, a top plate carried by said sliding carriage having an arcuate cut-out portion on one end in diagonal spaced relation to the arcuate cut-out portion of said bottom plate, said cut-out portions being centrally placed on opposite ends of the respective top and bottom plates and being so constructed and arranged that when the sliding carriage is in its retracted inoperative position the bottom of the central opening will be closed but access may be had through the top of said central opening, and a transversely disposed slicing knife carried by said carriage and positioned above said bottom plate completely forward of the arcuate shaped portion of said plate, said wall portion of said centrally positioned walled opening having a transverse slot completely therethrough in alignment with and lying in the same plane as the transverse slicing knife.

2. A bun slicing machine comprising a longitudinally extending casing having top, bottom, side, and end walls, said casing having a vertical centrally positioned walled opening completely therethrough, a carriage slidably mounted on said casing, each side wall of said casing having a longitudinally extending slot therethrough, said walled central opening having a transverse slot completely therethrough in alignment with and lying in the same plane as the side wall slots, a transversely disposed slicing knife carried by said carriage and extending through the side wall slots, a bottom plate carried by said carriage closing the bottom of the central opening when the sliding carriage is in its retracted inoperative position and having a cut-out portion on the opposite end for providing access to the bottom of the central opening when the sliding carriage has been moved to complete the cutting operation, and an inclined depending pusher plate secured transversely to the bottom wall of said sliding carriage, whereby when the sliding carriage has been moved to complete the cutting operation and is moved to its retracted inoperative position the cut bun under the machine will be conveyed out of the way and in front of the operator.

3. A bun slicing machine comprising a longitudinally extending casing having top, bottom, side, and end walls, said casing having a vertical centrally positioned walled opening completely therethrough, a carriage slidably mounted on said casing, each side wall of said casing having a longitudinally extending slot therethrough, said walled central opening having a transverse slot completely therethrough in alignment with and lying in the same plane as the side wall slots, a transversely disposed slicing knife carried by said carriage and extending through the side wall slots, a bottom plate carried by said carriage closing the bottom of the central opening when the sliding carriage is in its retracted inoperative position and having a cut-out portion on the opposite end for providing access to the bottom of the central opening when the sliding carriage has been moved to complete the cutting operation, an inclined depending pusher plate secured transversely to the bottom wall of said sliding carriage, and a cooperating guide member rigidly secured under said casing at the retracted position end thereof, whereby when the sliding carriage has been moved to complete the cutting operation and is moved to its retracted inoperative position the cut bun under the machine will be conveyed out of the way and in front of the operator.

References Cited in the file of this patent

UNITED STATES PATENTS

| Number | Name | Date |
|---|---|---|
| 470,186 | Fish | Mar. 8, 1892 |
| 2,006,643 | Leo | July 2, 1935 |
| 2,009,913 | Bever | July 30, 1935 |